(12) United States Patent
Colyar

(10) Patent No.: US 7,214,308 B2
(45) Date of Patent: May 8, 2007

(54) EFFECTIVE INTEGRATION OF SOLVENT DEASPHALTING AND EBULLATED-BED PROCESSING

(75) Inventor: James J. Colyar, Newtown, PA (US)

(73) Assignee: Institut Francais du Petrole (FR)

( * ) Notice: Subject to any disclaimer, the term of this patent is extended or adjusted under 35 U.S.C. 154(b) by 553 days.

(21) Appl. No.: 10/369,869

(22) Filed: Feb. 21, 2003

(65) Prior Publication Data

US 2004/0163996 A1 Aug. 26, 2004

(51) Int. Cl.
*C10G 3/00* (2006.01)
*C10G 47/00* (2006.01)

(52) U.S. Cl. ........................ 208/86; 208/39; 208/78; 208/107

(58) Field of Classification Search ................ 208/86, 208/39, 107, 78
See application file for complete search history.

(56) References Cited

U.S. PATENT DOCUMENTS

| | | | |
|---|---|---|---|
| RE25,770 E | | 4/1965 | Johnsen |
| 4,062,758 A | * | 12/1977 | Goudriaan et al. ........... 208/80 |
| 4,239,616 A | | 12/1980 | Gearhart |
| 4,317,711 A | * | 3/1982 | Yan .............................. 208/425 |
| 4,354,922 A | | 10/1982 | Derbyshire et al. |
| 4,354,928 A | | 10/1982 | Audeh et al. |
| 4,440,633 A | | 4/1984 | Jacquin et al. |
| 4,588,709 A | | 5/1986 | Carrasquel et al. |
| 4,776,945 A | | 10/1988 | Washechick et al. |
| 4,810,361 A | | 3/1989 | Absil et al. |
| 4,810,363 A | | 3/1989 | Van Den Berg |
| 5,198,100 A | | 3/1993 | Aldridge et al. |
| 5,225,383 A | | 7/1993 | Kukes et al. |
| 5,322,829 A | * | 6/1994 | Artes et al. ................. 502/315 |
| 6,270,654 B1 | * | 8/2001 | Colyar et al. ................. 208/57 |

* cited by examiner

*Primary Examiner*—Glenn A. Caldarola
*Assistant Examiner*—John Douglas
(74) *Attorney, Agent, or Firm*—John F. Ritter

(57) ABSTRACT

This invention relates to a novel method for economically processing vacuum residue from heavy crude oils by selectively processing the difficult and easy components in reactors whose design and operating conditions are optimized for the specific feed. The process utilizes an integrated solvent deasphalting (SDA)/ebullated-bed design wherein the heavy vacuum residue feedstock is initially sent to an SDA unit operated with $C_4/C_5$ solvent to achieve a high deasphalted oil (DAO) yield. The resulting SDA products, namely asphaltenes and DAO are separately treated in ebullated-bed reactor(s) systems whose design and operating conditions are optimized for a particular feedstock. The resulting net conversion, associated distillate yield and product qualities are greatly improved relative to treatment of the entire residue feedstock in a common ebullated-bed reactor system.

14 Claims, 2 Drawing Sheets

EFFECTIVE INTEGRATION OF SOLVENT DEASPHALTING AND EBULLATED-BED PROCESSING

TECHNICAL FIELD

This invention relates to a novel method for economically processing atmospheric or vacuum residue from heavy crude oils. This is accomplished by selectively processing the difficult and easy components obtained by solvent deasphalting ("SDA") of the residue in downstream conversion reactor systems whose design and operating conditions are optimized for the specific SDA component.

Definitions

The term "asphaltenes" as used herein means a heavy polar fraction and are the residue which remains after the resins and oils have been separated from the feed residue fed to a deasphalting unit. Asphaltenes from vacuum resid are generally characterized as follows: a Conradson or Ramsbottom carbon residue of 15 to 90 weight % and a hydrogen to carbon (H/C) atomic ratio of 0.5 to 1.5. Asphaltenes can contain from 50 ppm to over 5000 ppm vanadium and from 20 ppm to over 2000 ppm nickel. The sulfur concentration of asphaltenes can be from 110% to 350% greater than the concentration of sulfur in the resid feed oil to the deasphalter. The nitrogen concentration of asphaltenes can be from 100% to 350% greater than the concentration of nitrogen in the resid feed oil to the deasphalter.

The terms "resid oil", "residue", and "resid" as used herein mean residual oil.

As used herein, the terms "solvent deasphalter", "deasphalting unit" and "deasphalter" mean one or more vessels or other equipment which are used to separate atmospheric or vacuum resid into deasphalted oil ("DAO"), resins, and asphaltenes, by means of one or more solvents.

The term "deasphalted oil" (DAO) as used herein means oils that are generally the least dense products produced in a deasphalting unit and comprise saturate aliphatic, alicyclic, and some aromatic hydrocarbons. Deasphalted oil generally comprises less than 30% aromatic carbon and relatively low levels of heteroatoms except sulphur. Deasphalted oil from vacuum resid can be generally characterized as follows: a Conradson or Ramsbottom carbon residue of 1 to less than 12 weight % and a hydrogen to carbon (H/C) ratio of 1.0% to 2%. Deasphalted oil can contain 100 ppm or less, preferably less than 5 ppm, and most preferably less than 2 ppm, of vanadium and 100 ppm or less, preferably less than 5 ppm, and most preferably less than 2 ppm of nickel. The sulfur and nitrogen concentrations of deasphalted oil can be 90% or less of the sulfur and nitrogen concentrations of the resid feed oil to the deasphalter.

Hydrogen efficiency in a hydrogen addition upgrading process refers to a fraction of chemically consumed hydrogen which is used for heteroatom removal and for hydrogenation/saturation of liquid hydrocarbons.

BACKGROUND OF THE INVENTION

Hydrocarbon compounds are useful for a number of purposes. In particular, hydrocarbon compounds are useful, inter alia, as fuels, solvents, degreasers, cleaning agents, and polymer precursors. The most important source of hydrocarbon compounds is petroleum crude oil. Refining of crude oil into separate hydrocarbon compound fractions is a well-known processing technique.

Crude oils range widely in their composition and physical and chemical properties. In the last two decades the need to process heavier crude oils has increased. Heavy crudes are characterized by a relatively high viscosity and low API gravity (generally lower than 25°) and high percentage of high boiling components (>950° F.)

Refined petroleum products generally have higher average hydrogen to carbon ratios on a molecular basis. Therefore, the upgrading of a petroleum refinery hydrocarbon fraction is classified into one of two categories: hydrogen addition and carbon rejection. Hydrogen addition is performed by processes such as hydrotreating and hydrocracking. Carbon rejection processes typically produce a stream of rejected high carbon material which may be a liquid or a solid; e.g., coke deposits.

Some carbon rejection processes such as FCC and coking include cracking of heavy molecules. Others such as solvent deasphalting consist only of physical separation of the lighter and heavier hydrocarbons. For instance, in solvent deasphalting of a heavy oil, a light solvent such as a $C_4$ or $C_5$ hydrocarbon is used to dissolve or suspend the lighter hydrocarbons allowing the asphaltenes to be "precipitated". These phases are separated and then the solvent is recovered. Additional information on solvent deasphalting conditions, solvents and operations may be obtained from U.S. Pat. Nos. 4,239,616; 4,440,633; 4,354,922; and, 4,354,928, all of which are incorporated herein by reference.

To facilitate processing, heavy crudes or their fractions are generally subjected to thermal cracking or hydrocracking to convert the higher boiling fractions to lower boiling fractions, followed by hydrotreating to remove heteroatoms such as sulfur, nitrogen, oxygen and metallic impurities.

Further information on hydrotreating catalysts, techniques and operating conditions for residue feeds may be obtained by reference to U.S. Pat. Nos. 5,198,100; 4,810,361; 4,810,363; 4,588,709; 4,776,945 and 5,225,383 which are incorporated herein for this teaching.

Crude petroleums with greater amounts of impurities including asphaltenes, metals, organic sulfur and organic nitrogen require more severe processing to remove them. Generally speaking, the more severe the conditions required to treat a given feedstock (e.g. higher temperature and pressures), the greater the cost of overall plant.

In particular, asphaltenes produce high amounts of coke which deactivates the hydrotreating and hydrocracking catalysts. Asphaltenes also form precipitates and contain precipitate precursors which greatly hinder subsequent processing.

In general, ebullated-bed reactors are utilized to process heavy crude oil feed streams, particularly those feeds with high metals and CCR. The ebullated-bed process comprises the passing of concurrently flowing streams of liquids, or slurries of liquids and solids, and gas through a vertically elongated fluidized catalyst bed. The catalyst is fluidized and completely mixed by the upwardly flowing liquid streams. The ebullated-bed process has commercial application in the upgrading of heavy liquid hydrocarbons and converting coal to synthetic oils.

The ebullated-bed reactor and related process is generally described in U.S. Pat. No. 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that at steady state, the bulk of the catalyst does not rise above a definable level in the reactor. Vapors, along with the liquid which is being hydrogenated, pass through the upper level of catalyst particles into a substantially catalyst free zone and are removed from the upper portion of the reactor.

Ebullated-bed reactors are generally operated at high temperatures and pressures in order to process these heavy feedstocks. Since such operating parameters substantially increase the cost of designing and constructing the reactors, it would therefore be advantageous to have a system wherein the overall design and manufacturing costs were optimized for specific feedstocks or feedstock components. This optimization would result in a lower initial investment and lower annual operating costs. Moreover, there is always a need to design process systems that convert greater amounts of feedstock into high quality products.

SUMMARY OF THE INVENTION

The object of this invention is to provide a new integrated SDA/ebullated-bed process for economically converting and/or upgrading atmospheric or vacuum residue from heavy crudes.

It is another object of this invention to provide an integrated SDA/ebullated-bed process which is optimized for particular feedstock components resulting in a lower overall cost of design, manufacture, and operation.

It is a further object of the invention to provide an integrated SDA/ebullated-bed process that utilizes catalysts that are specifically tailored for a given feedstock or feedstock component.

It is yet another object of this invention to provide an integrated SDA/ebullated-bed process that minimizes the risk of over-conversion of the feedstock and resulting excessive sedimentation and fouling with no over-conversion. Additionally, the invention will result in reduced light gas yields and increases in hydrogen efficiency.

A novel feature of this invention is the utilization of a solvent deasphalter("SDA") in the initial processing of the atmospheric or vacuum resid feedstock to separate it into DAO and asphaltenes. The DAO can thereafter be further processed at lower temperature and pressure in an ebullated-bed reactor while the smaller quantity of asphaltenes are processed through a more severe ebullated-bed reactor system.

More particularly, this invention teaches a process of relieving downstream burdens and fouling in a resid conversion/upgrading unit, said method comprising the steps of:
 a) feeding a atmospheric or vacuum residue feedstock, 30%–100% of said feedstock boiling above 975° F., to a solvent deasphalter ("SDA") to provide an asphaltene stream and a deasphalted oil stream;
 b) processing said asphaltene stream through one or more ebullated-bed reactors; and
 c) processing said deasphalted oil stream through at least one ebullated-bed reactor, said ebullated-bed reactor or reactors different and feedstock optimized from those used to process said asphaltene stream;
wherein steps a–c achieve an overall vacuum residue conversion of greater than 65%.

DETAILED DESCRIPTION OF THE INVENTION

Figure 1:
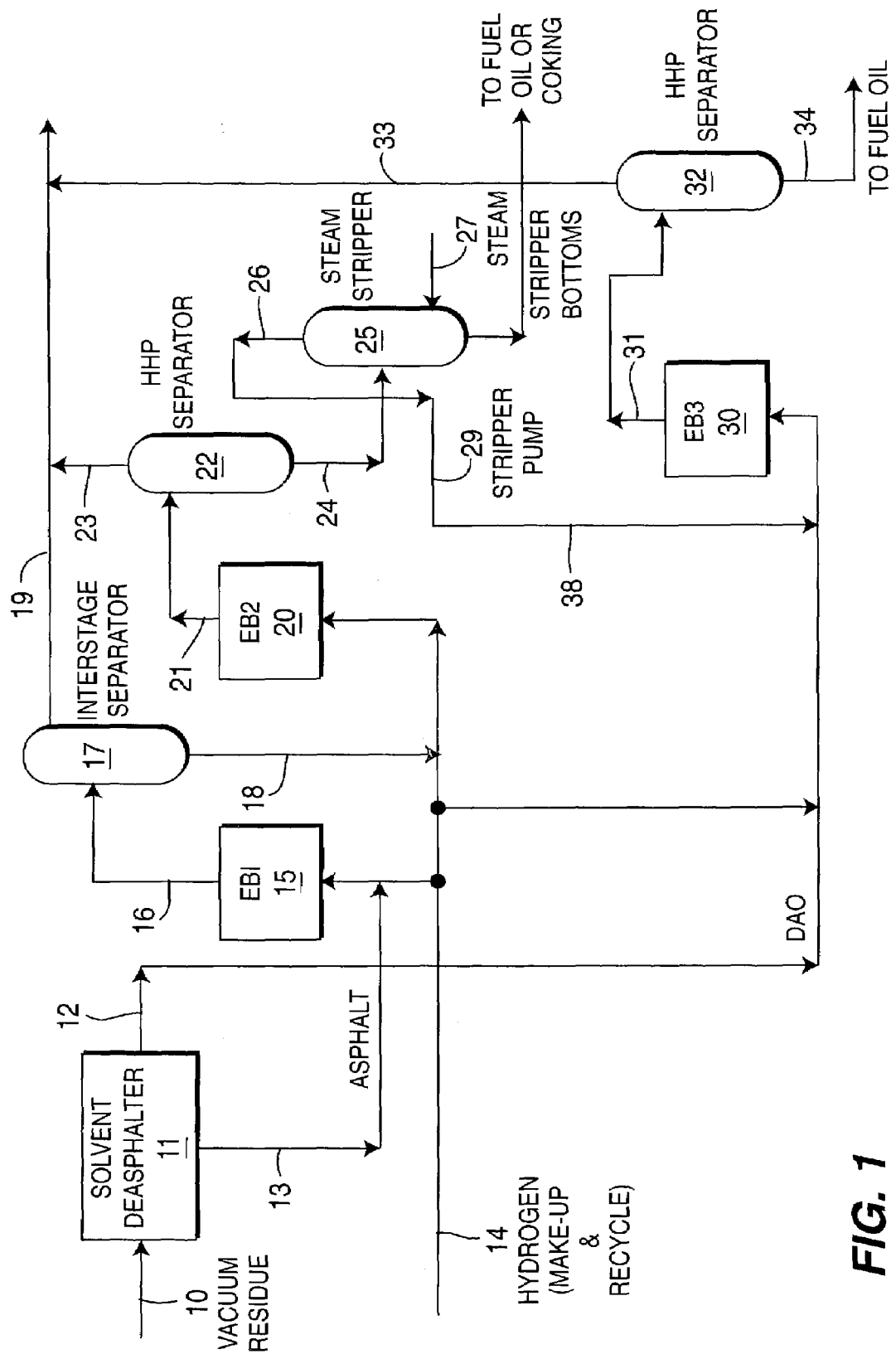
FIG. 1 shows a schematic flowsheet of the atmospheric or vacuum resid hydroconversion process.

FIG. 1 shows a schematic flowsheet of the atmospheric or vacuum resid hydroconversion process. Resid feedstock is provided at 10 and fed into a solvent deasphalting separator ("SDA") 11 where it is separated into deasphalted oil ("DAO") stream 12 and an asphaltene stream 13.

The solvent utilized in the SDA unit may be any suitable hydrocarbonaceous material which is a liquid within suitable temperature and pressure ranges for operation of the countercurrent contacting column, is less dense than the feed stream, and has the ability to readily and selectively dissolve desired components of the feed stream and reject the asphaltic materials also commonly known as pitch. The solvent may be a mixture of a large number of different hydrocarbons having from 3 to 14 carbon atoms per molecule, such as a light naphtha having an end boiling point below about 200° F. (93° C.).

The solvent may be a relatively light hydrocarbon such as ethane, propane, butane, isobutane, pentane, isopentane, hexane, heptane, the corresponding mono-olefinic hydrocarbons or mixtures thereof. Preferably, the solvent is comprised of paraffinic hydrocarbons having from 3 to 7 carbon atoms per molecule and can be a mixture of 2 or more hydrocarbons. For instance, a preferred solvent may be comprised of a 50 volume percent mixture of normal butane and isopentane.

The solvent deasphalting conditions include a temperature from about 50° F. (10° C.) to about 600° F. (315° C.) or higher, but the deasphalter operation is preferably performed within the temperature range of 100° F. (38° C.)—400° F. (204° C.). The pressures utilized in the solvent deasphalter 11 are preferably sufficient to maintain liquid phase conditions, with no advantage being apparent to the use of elevated pressures which greatly exceed this minimum. A broad range of suitable pressures is from about 100 psig (689 kPag) to 1000 psig (6895 kPag) with a preferred range being from about 200 psig (1379 kPag) to 600 psig is (4137 kPag). An excess of solvent to charge stock should preferably be maintained. The solvent to charge stock volumetric ratio should preferably be between 2:1 to about 20:1 and preferably from about 3:1 to about 9:1. The preferred residence time of the charge stock in the solvent deasphalter 11 is from about 10 to about 60 minutes.

The resulting deasphalted oil steam 12 produced in the solvent deasphalter is introduced into the mild ebullated-bed hydrocracking reactor as hereinabove described. Preferably, the SDA unit is operated with a $C_4/C_5$ solvent to obtain a high lift (high DAO yield).

The aphaltenes 13 are thereafter feed into a first ebullated-bed unit 15 along with make-up and recycle hydrogen provided at 14. The first ebullated-bed unit 15 is operated at relatively high pressure (2,500–3,000 psi total pressure). In a two-stage in series reactor system, the effluent from the first ebullated-bed reactor is sent through line 16 to an interstage separation vessel 17 where it is phase separated into a gaseous and a liquid fraction. The interstage separation unit maximizes the process efficiency in this two-stage example. The gaseous phase effluent, comprised largely of hydrogen and gaseous and vaporized hydrocarbons is drawn off by line 19 and thereafter conventionally treated to recover hydrogen, hydrocarbon gases, etc. The liquid phase effluent is sent though line 18 where it is combined with make-up and recycle hydrogen and thereafter sent to a second ebullated-bed reactor 20.

Typically, two reactors in series would be utilized in order to achieve high conversion and good hydrocracking/hydrogenation of the asphaltenes. Moreover, both reactors would be required to operate at a relatively high temperature in order to achieve 60%–80% conversion of the asphaltenes to distillates. For a high metals feedstock, it is preferable to use a wide pore extrudate catalyst since it would provide a high level of asphaltene conversion and metals retention.

However, it is noted that although this particular description of the invention utilizes separate ebullated-bed reactors to process the asphaltenes, it is conceivable that a single reactor may be utilized depending on the product slate, qualities required, and the composition of the feedstock to be processed.

The second ebullated-bed reactor effluent 21 is passed through the external hot, high pressure separator ("HHPS") 22 wherein it is separated into gas and liquid phases. The gas phase, comprised largely of hydrogen and gaseous and vaporized hydrocarbons is drawn off by line 23 and thereafter conventionally treated to recover hydrogen, hydrocarbon gases, etc. Although not shown here, it is typical to utilize the separated purified hydrogen as part of the hydrogen feed 14 to the system.

Figure 2:
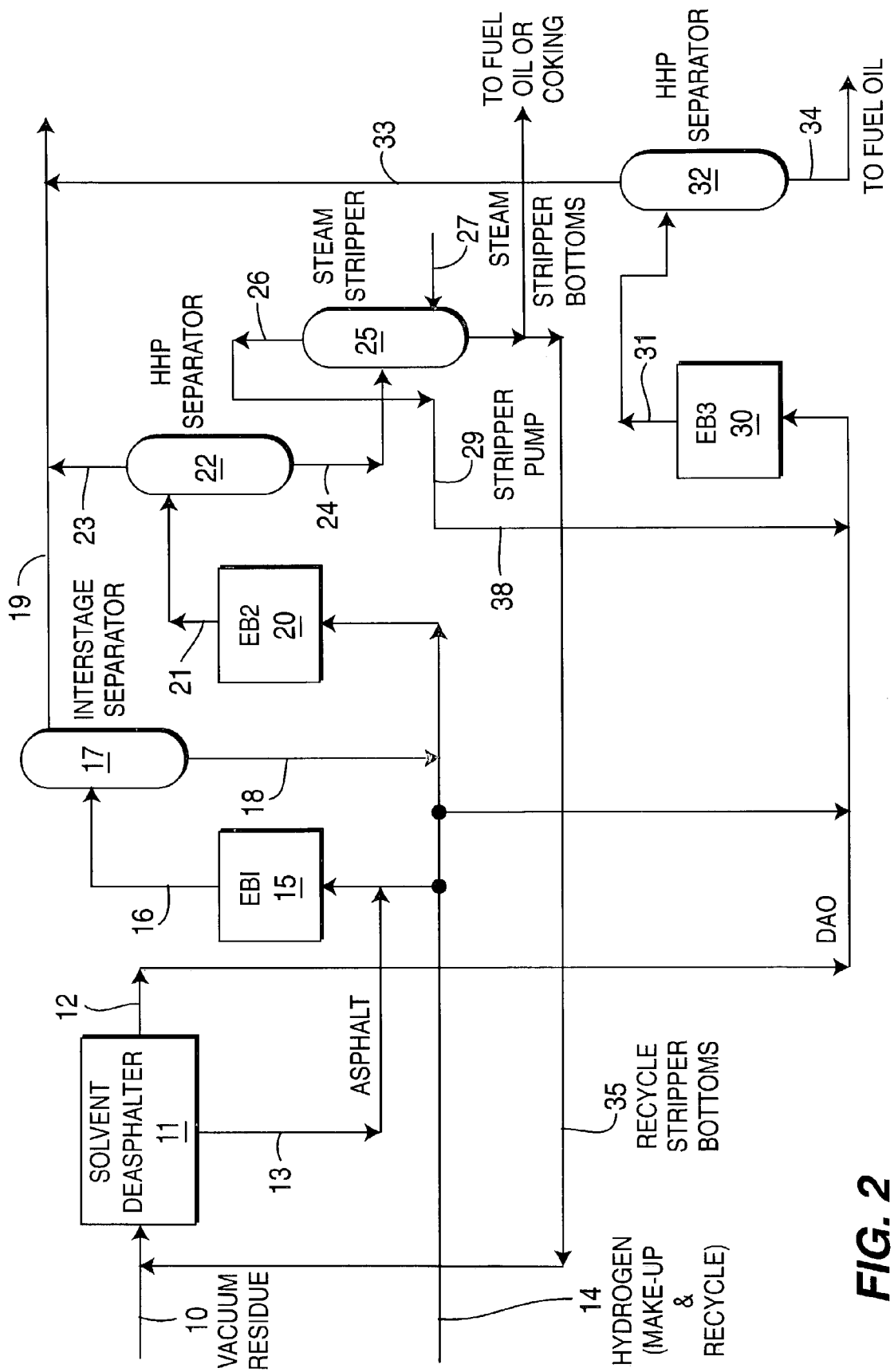
FIG. 2 shows a schematic flowsheet of the vacuum resid process showing the recycling of stripper bottoms to the solvent deasphalting unit.

The net liquid phase drawn from the HHPS 22 through line 24 is sent to a steam stripper 25. Steam is supplied to the atmospheric steam stripper through line 27. Stripper bottoms products (nominal 65° F.+ boiling) are drawn off to the battery limits at line 28 and can be utilized for combustion, coking, or heavy fuel oil production. Optionally, as shown in FIG. 2, a portion of the stripper bottoms recycle can be recycled back via stream 35 to the SDA unit. The unconverted asphaltenes in the stripper bottoms will be separated in the SDA and will be partially converted in the first two ebullated-bed reactors 15 & 20.

Overhead product from steam stripper 25 is drawn of by line 26 and is pumped to reactor pressure using a stripper pump 29 and sent through line 38 to a third ebullated-bed reactor 30 after being combined with DAO feedstock 12 from the SDA unit 11.

The combined DAO and steam stripper overhead product is now much easier to process because the asphaltenes and other contaminants have been removed. Therefore, the temperature and pressure and required catalyst volume in this third ebullated-bed reactor 30 is substantially lower than in the initial ebullated-beds 15 and 20. This will result in significantly reduced plant investment. The total pressure in this third ebullated-bed reactor 30 is typically between 1,200 and 2000 psi.

The third ebullated-bed unit 30 is operated at a high residue conversion (80%–90%) and would utilize a catalyst tailored specifically for DAO and heavy vacuum gas oil ("HVGO") type feedstocks.

Product from this third reactor 30 is thereafter sent to another external hot, high pressure separator ("HHPS") 32 and further downstream processing. The gas phase, comprised largely of hydrogen and gaseous and vaporized hydrocarbons is drawn off by line 33 and thereafter conventionally treated with the gas phase from the other HHPS unit to recover hydrogen, hydrocarbon gases, etc. for use as recycle to the ebullated-bed reactors.

The net liquid phase drawn from the HHPS 32 through line 34 and is suitable for producing good quality fuel oil.

The reactors are maintained at broad reaction conditions as shown in the Tables 1 and 2 below:

TABLE 1

EBULLATED BED REACTORS #1 & 2 - Asphaltene Feed

| Condition | Broad | Preferred |
|---|---|---|
| Feedstock Residue Content, vol. % 1000° F.+ | 50–100 | 80–100 |
| Overall Reactor LHSV (liquid hourly space velocity), hr-1 | 0.1–1.0 | 0.2–0.5 |
| Reactor Temperature ° F. | 700–850 | 770–820 |
| Reactor total pressure, psig | 500–3500 | 2,500–3,000 |
| Reactor outlet hydrogen partial pressure, psi | 1500–2,500 | 1,800–2,100 |
| Catalyst Replacement Rate, lb/bbl | 0.03–1.0 | 0.05–0.30 |

TABLE 2

EBULLATED BED REACTOR #3 - DAO and Cracked Distillate Feeds

| Condition | Broad | Preferred |
|---|---|---|
| Feedstock Residue Content, vol. % 650° F.+ | 50–100 | 80–100 |
| Reactor LHSV (liquid hourly space velocity), hr-1 | 0.3–3.0 | 0.5–1.5 |
| Reactor Temperature ° F. | 700–850 | 750–800 |
| Reactor total pressure, psig | 500–3000 | 800–2,000 |
| Reactor outlet hydrogen partial pressure, psi | 400–2,000 | 500–1,500 |
| Catalyst Replacement Rate, lb/bbl | 0.03–0.5 | 0.05–0.20 |

Relative to processing the entire atmospheric or vacuum residue in an ebullated-bed reactor system, this novel configuration selectively processes the difficult and easy components in reactor systems whose design and operating conditions are optimized for a specific feed. Because the asphaltenes are separated in an SDA unit, the overall efficiency of the process design in this invention is greater as shown in Table 3 below. As shown in the table, using a smaller total reactor volume, a higher total level of conversion is achieved. This process results in a higher conversion of the feedstock vacuum residue since the separately processed DAO can be treated at a higher (80–90V %) level of residue conversion. For evwn higher levels of overall vacuum residue conversion, the total reactor volume requirement may be higher than for pre-invention (typical) designs.

TABLE 3

Comparison of Overall Process Efficiency

| | Typical Processing in Two-Stage Unit | Processing Utilizing Current Invention |
|---|---|---|
| Feedrate to First Two Ebullated-Bed Reactor (In Series) BPSD | 50,000 | 15,000 (asphaltenes) |
| Relative Reactor Volume | 1.00 | 0.36 |
| Heavy Unconverted Vacuum Residue, BPSD (65% conversion) | 17,500 | 5,250 |
| Feed rate to third ebullated-bed reactor, BPSD | — | 35,000 (DAO) |
| Relative Reactor Volume of third reactor | — | 0.42 |

TABLE 3-continued

Comparison of Overall Process Efficiency

| | Typical Processing in Two-Stage Unit | Processing Utilizing Current Invention |
|---|---|---|
| Unconverted residue DAO (80% conversion) | — | 7,000 |
| Total Reactor Volume | 1.00 | 0.78 |
| Total unconverted vacuum residue, BPSD | 17,500 | 12,250 |
| Overall Vacuum Residue Conversion, vol % | 65 | 75.5 |

FIG. 2 shows the same process described above except that a portion of the stripper bottoms products (nominal 65° F.+ boiling) can be sent through line 35 to the SDA unit 11 after it has been combined with fresh vacuum resid feedstock from line 10. The vacuum resid is a good peptizing agent for the unconverted ashpaltenes, thus minimizing the risk of asphaltene precipitation and fouling. The remaining net stripper bottoms are utilized for combustion, coking, or heavy oil production. This recycle increases the concentration of asphaltenes to the first ebullated-bed reactors and further increases the level of net conversion.

EXAMPLE 1

A vacuum residue feedstock derived from a Western Canadian heavy crude is converted in order to produce distillate material and a heavy fuel oil. Because of the heavy nature (high CCR and metals) of this crude, an ebullated-bed reactor is typically specified. This example will illustrate and compare conventional processing and processing incorporating this invention. The Western Canadian vacuum residue has the following inspections and yields/qualities when processed in a SDA unit.

TABLE 4

| | Vacuum Residue | Asphaltenes | DAO |
|---|---|---|---|
| W % | 100 | 42.1 | 57.9 |
| Gravity, ° API | 100 | 42.1 | 57.9 |
| Residue Content (975° F.), Wt. % | 94 | 0 | 12 |
| Nitrogen, Wt. % | 0.62 | 0.85 | 0.42 |
| Sulfur, wt. % | 5.53 | 7.36 | 4.2 |
| CCR, W % | 24 | 42 | 11 |
| Nickel, wppm | 115 | 232 | 30 |
| Vanadium, Wppm | 270 | 551 | 66 |
| $C_7$ insolubles, W % | 17 | 40 | Less than 50 wppm |

In a pre-invention processing configuration, all of the vacuum residue is sent to an ebullated-bed reactor system and a typical maximum conversion of 65% is obtained. Typical product rates and required ebullated-bed reactor volume is shown in Table 5.

TABLE 5

| | Pre-Invention | Present Invention | | |
|---|---|---|---|---|
| Feed | Vacuum Residue | Asphaltene Step | DAO Step | Total |
| Reactor Volume, $V_{reactor}/V_{feed/hr}$ | 2.0 | 4.0 | 2.0 | 2.5 |
| Residue (524° C.$^+$) Conversion, % | 65 | 65 | 90 | 79.5 |
| Product Rates, w % | | | | |
| Naphtha | 10.0 | 11 | 16.1 | 14.0 |
| Diesel | 20.3 | 18 | 36.5 | 28.7 |
| Gas Oil | 30.2 | 28 | 30.1 | 29.2 |
| Residue | 32.9 | 35 | 9.4 | 20.2 |
| HDS, W % | 75 | 72 | 96.8 | 86.3 |
| HDN, W % | 25 | 22 | 68.5 | 48.9 |
| HDCCR, W % | 52 | 48 | 88.5 | 71.4 |
| Total Distillate Yield, W % | 60.5 | 57 | 82.7 | 71.9 |

As shown in Table 5, the invention results in a higher overall conversion of the vacuum residue (79.5% versus 65%) and greatly improved product quality as indicated by higher levels of heteroatom removal (86.3 W % versus 75 W % HDS and 48.9 W % versus 25 W % HDN). Because of the higher residue conversion, the yield of desirable distillates is increased by nearly 20 percent, from 60.5 W % of the feed to 71.9 W % of the feed. This improvement in overall process performance is accomplished in this example by using a total reactor volume of just 25% greater than the pre-invention design.

Although not illustrated in the example, as shown in FIG. 2, the unconverted atmospheric bottoms from the asphaltene conversion step, obtained via an atmospheric stripper (stream 35) can be recycled to the SDA unit.

This recycle is effective since during ebullated-bed processing of the asphaltene stream, a small quantity of additional asphaltenes can be produced via condensation/polymerization reactions. The SDA will phase separate these recycled asphaltenes and route this material back to the first ebullated-bed system. The net effect will be and even higher level of vacuum residue conversion than indicated in Table 5. An overall conversion of 85 W % or more will be obtained.

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof.

I claim:

1. A process of relieving downstream burdens and fouling in a resid conversion/upgrading unit, said method comprising the steps of:
   a) feeding a atmospheric or vacuum residue feedstock, 30%–100% of said feedstock boiling above 975° F., to a solvent deasphalter ("SDA") having a $C_4/C_5$ solvent to provide an asphaltene stream and a deasphalted oil stream;

b) processing said asphaltene stream through one or more ebullated-bed reactors to create; and c) processing said deasphalted oil stream through at least one ebullated-bed reactor, said ebullated-bed reactor or reactors different and feedstock optimized from those used to process said asphaltene stream;

wherein steps a–c achieve an overall residue conversion of greater than 65%.

2. The method of claim 1 wherein steps a–c achieve an overall residue conversion of greater than 70%.

3. The method of claim 1 wherein steps a–c achieve an overall residue conversion of greater than man 75%.

4. The method of claim 1 wherein the ebullated-bed unit used to process said asphaltene stream is operated at a total pressure of between 1500 and 3000 psia, a temperature of between 750° F.–850° F., a LHSV of between 0.1 and 1.0 hr$^{-1}$, and a catalyst replacement rate of between 0.1 and 1.0 lbs/bbl.

5. The method of claim 1 wherein the ebullated-bed unit or units used to process said asphaltene stream is operated at a total pressure of between 500 and 3000 psia, a temperature of between 730° F.–820° F., a LHSV of between 0.2 and 1.5 hr$^{-1}$, and a catalyst replacement rate of between 0.05 and 0.5 lbs/bbl.

6. The method of claim 1 wherein the SDA unit utilizes a $C_4/C_5$ solvent to separate the heavy residue feedstock into a asphaltene stream and a deasphalted oil stream.

7. The method of claim 1 wherein the asphaltene stream is processed in only one ebullated-bed reactor.

8. The method of claim 1 wherein the asphaltene stream is processed in two ebullated-bed reactors in series.

9. The method of claim 1 wherein the asphaltene stream is processed in three ebullated-bed reactors in series.

10. The method of claim 1 wherein the deasphalted oil stream is processed in only one ebullated-bed reactor.

11. The method of claim 1 wherein the deasphalted oil stream is processed in two ebullated-bed reactors in series.

12. The method of claim 1 wherein the deasphalted oil stream is processed in three ebullated-bed reactors in series.

13. The method of claim 1 wherein greater than 50% of the atmospheric or heavy residue feedstock boils above 975° F.

14. A process of relieving downstream burdens and fouling in a resid conversion/upgrading unit, said method comprising the steps of:

a) feeding a atmospheric or vacuum residue feedstock, 30%–100% of said feedstock boiling above 975° F., to a solvent deasphalter ("SDA") having a $C_4/C_5$ solvent to provide an asphaltene stream and a deasphalted oil stream;

b) processing said asphaltene stream through one or more ebullated-bed reactors; and c) processing said deasphalted oil stream through at least one ebullated-bed reactor, said ebullated-bed reactor or reactors different and feedstock optimized from those used to process said asphaltene stream;

d) separating the asphaltene stream from step b) in a steam stripper to provide a stripper bottoms stream;

e) recycling at least a fraction of said stripper bottoms stream back to the SDA; and wherein steps a–c achieve an overall residue conversion of greater than 65%.

* * * * *